July 27, 1943.  E. W. FREDRICKSON  2,325,387
WORK CLAMPING DEVICE
Filed Aug. 22, 1942
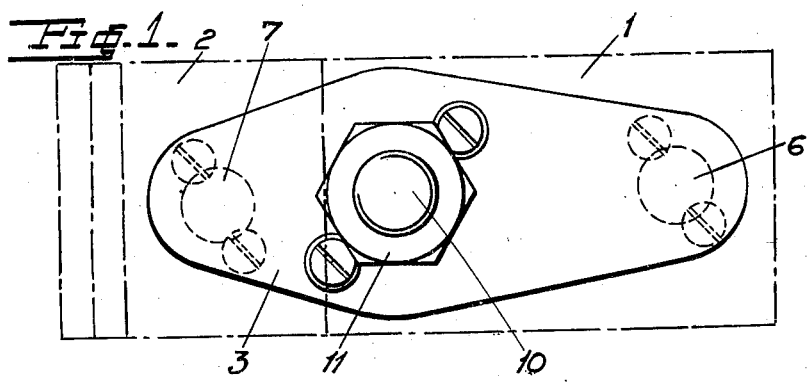
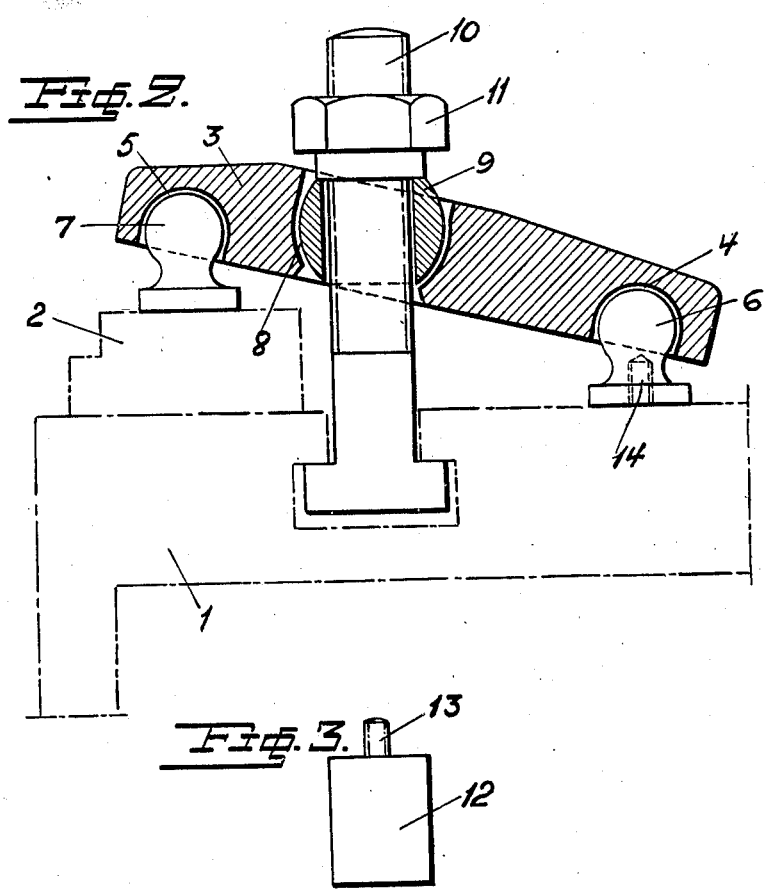
ERNST WALDEMAR FREDRICKSON
INVENTOR
ATTORNEYS Patented July 27, 1943

2,325,387

UNITED STATES PATENT OFFICE 2,325,387

WORK CLAMPING DEVICE

Ernst Waldemar Fredrickson, Stockholm, Sweden

Application August 22, 1942, Serial No. 455,731
In Sweden December 9, 1940

6 Claims. (Cl. 90—59)

The present invention relates to a device for clamping workpieces to a given base, e. g. to a drilling, milling or planing machine, or to a planing bench or other such work bench.

More specifically the invention is concerned in a device of the type described, comprising in combination an arm member provided with oscillably connected pressure members, a screw bolt situated between the said pressure members, connected to the base and passing through the arm member, and a tightening nut on the said bolt for pressing the pressure members against the base and the workpiece simultaneously, said pressure members being connected to the arm member through the intermediary of ball and socket joints. A further feature of the said invention consists in the fact that the screw bolt is connected to the arm member through the intermediary of a ball- and socket-joint.

One embodiment of the invention is described by way of example in the accompanying drawing, wherein Figure 1 represents a plan view of the device, and Figure 2 a longitudinal section therethrough. Figure 3 represents a supplementary detail of the clamping device.

In the drawing the reference numeral 1 designates any given base and 2 a workpiece attached thereto. The arm 3 of the clamping device is provided on its underside near each of its ends with hemispherical recesses 4, 5 adapted to receive substantially spherical pressure members 6, 7 respectively which are intended to press against the workpiece and base respectively by means of foot pieces having plane undersides.

Formed from the upper side of the arm and situated between the pressure members is a further hemispherical recess 8 adapted to receive a substantially spherical inset member 9, through which a screw bolt 10, which is connected at one end to the base, passes and against the upper plane face of which a nut 11 threaded on the bolt is arranged to be tightened.

It will now be readily appreciated that by this ball and socket joint connection not only between the arm and the pressure members but also between the arm and the screw bolt the advantage is achieved that independently of the thickness of the workpiece, or in other words the slant of the arm, and independently of whether the workpiece is of equal or tapering thickness, the pressure members will adjust themselves to abut the base or the workpiece fully and effectively, whilst the tightening nut independently of the slant of the arm will always fully abut the upper side of the arm, i. e. the upper face of the spherical inset member mounted in the arm and around which the arm is adjustable in all directions, a fact which is also characteristic of the pressure members in relation to the arm.

In the event of the workpiece being comparatively thick involving such a position of the arm, as the connection between this arm and the bolt will not permit, the foot piece of the pressure member 6 co-operating with the base may be increased in length, e. g. by the addition of an extra bottom portion of the kind shown for example in Figure 3, which for this purpose is provided with a screw-threaded bolt 13, screwed into a corresponding hole 14 in the pressure member.

What I claim as new and desire to secure by Letters Patent of the United States is:

1. A device for clamping a workpiece to a given base, which comprises in combination an arm member provided with oscillably connected pressure members, a screw bolt situated between the said pressure members, connected to the base and passing through the arm member, and a tightening nut on this bolt for engaging the pressure members against the base and against the workpiece simultaneously, the said pressure members being connected to the arm member through the intermediary of ball and socket joints.

2. A device for clamping a workpiece to a given base, which comprises in combination an arm member provided with oscillably connected pressure members, a screw bolt situated between the said pressure members connected to the base and passing through the arm member, and a tightening nut on this bolt for bringing the pressure members against the base and against the workpiece simultaneously, said screw bolt being connected to the arm member through the intermediary of a ball and socket joint.

3. A device for clamping a workpiece to a given base, which comprises in combination an arm member provided with oscillably connected pressure members, a screw bolt situated between the said pressure members, connected to the base and passing through the arm member, and a tightening nut on this bolt for engaging the pressure members against the base and against the workpiece simultaneously, said pressure members and said screw bolt being connected to the arm member through the intermediary of ball and socket joints.

4. A device for clamping a workpiece to a given base, comprising a fulcrumed lever provided near each of its ends with a contact pressure member, one to engage the workpiece and the other said base, said members being adjustable in any angular position of their contact surfaces for engagement of a surface of any angular disposition, a screw bolt anchored in the base, and passing through the lever at its fulcrum and being secured within the lever by means of a substantially spherical member centrally apertured for passage of the bolt therethrough, the lever being recessed substantially to the configuration of said spherical member, and a tightening nut upon the bolt, whereby pressure can be applied to the aggregate of lever and contact pressure members to clamp the workpiece rigidly to said base.

5. A device as claimed in claim 4 in which the adjustability of the contact pressure members is provided by means of a ball and socket joint of the member with the lever.

6. A device for clamping a workpiece to a given base, comprising a fulcrumed lever having at its fulcrum a substantially spherical recess, a substantially spherical member positioned within said recess, a screw bolt extending through said spherical member, and a pair of contact pressure members depending from the end portions of said lever, and secured therein by means of circular socket recesses and ball elements of said members adjustably securing said contact pressure members within said circular socket recesses.

ERNST WALDEMAR FREDRICKSON.